United States Patent
Kosaki

(10) Patent No.: US 6,819,940 B1
(45) Date of Patent: Nov. 16, 2004

(54) MOBILE COMMUNICATIONS SYSTEM

(75) Inventor: Hitoshi Kosaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/500,084

(22) Filed: Feb. 8, 2000

(30) Foreign Application Priority Data

Sep. 13, 1999 (WO) ................................. PCT/JP99/4958

(51) Int. Cl.⁷ ............................. H04Q 7/20; H04M 1/00
(52) U.S. Cl. .................... 455/552.1; 455/434; 455/426; 455/427; 455/450; 455/553.1
(58) Field of Search ............................ 455/426.1, 427, 455/552.1, 553.1, 434, 450

(56) References Cited

U.S. PATENT DOCUMENTS

| | | | | |
|---|---|---|---|---|
| 5,533,098 A | * | 7/1996 | Lee | 455/426 |
| 5,732,359 A | * | 3/1998 | Baranowsky et al. | 455/552 |
| 6,148,176 A | * | 11/2000 | Kolev et al. | 455/12.1 |
| 6,249,677 B1 | * | 6/2001 | Noerpel et al. | 455/427 |
| 6,434,397 B1 | * | 8/2002 | Hazama | 455/515 |

FOREIGN PATENT DOCUMENTS

| | | |
|---|---|---|
| EP | 0 597 225 A1 | 9/1993 |
| EP | 0 831 599 A2 | 3/1998 |
| GB | 2 320 399 A | 6/1998 |
| JP | 6318902 | 11/1994 |
| JP | 9074587 | 3/1997 |
| JP | 1155717 | 2/1999 |
| WO | WO 95/27381 A1 | 10/1995 |

* cited by examiner

*Primary Examiner*—Lee Nguyen
*Assistant Examiner*—Yuwen Pan
(74) *Attorney, Agent, or Firm*—Rothwell, Figg, Ernst & Manbeck

(57) ABSTRACT

A mobile communications system includes mobile communications terminal equipment capable of switching among a plurality of mobile communications systems including the former system, such as a ground cellular communications system and a mobile satellite communications system, to establish communication with one of them. The plurality of mobile communications systems provide different cells that are overlapped. The mobile communications system can provide and utilize channel information on a channel selected when the mobile communications terminal equipment to switch between the mobile communications system and another mobile communications system. The mobile communications system transmits the channel information on the other communications system to the mobile communications terminal equipment. The mobile communications terminal equipment can switch from the mobile communications system to the other mobile communications system to establish connection with the other mobile communications system based on the channel information.

6 Claims, 10 Drawing Sheets

FIG.3

| THE NUMBER OF SYSTEMS |
|---|
| SYSTEM ID |
| THE NUMBER OF CHANNELS |
| FREQUENCY |
| TDM OFFSET |
| FREQUENCY |
| TDM OFFSET |
| ⋮ |
| FREQUENCY |
| TDM OFFSET |
| SYSTEM ID |
| THE NUMBER OF CHANNELS |
| FREQUENCY |
| TDM OFFSET |
| ⋮ |

FIG.7

| THE NUMBER OF SYSTEMS |
|---|
| SYSTEM ID |
| THE NUMBER OF CHANNELS |
| CELL NUMBER |
| CELL NUMBER |
| CELL NUMBER |
| ⋮ |
| CELL NUMBER |
| SYSTEM ID |
| THE NUMBER OF CHANNELS |
| CELL NUMBER |
| CELL NUMBER |
| ⋮ |

FIG.8

|  | FREQUENCY | TDM OFFSET |
|---|---|---|
| CELL NUMBER#1 | f1 | T1 |
| CELL NUMBER#2 | f2 | T2 |
| CELL NUMBER#3 | f3 | T3 |
| CELL NUMBER#4 | f4 | T4 |
| ⋮ | ⋮ | ⋮ |
| CELL NUMBER#N | fN | TN |

MOBILE COMMUNICATIONS SYSTEM

BACKGROUND OF THE INVENTION

1. Field of the Invention

The present invention relates to a mobile communications system including mobile communications terminal equipment capable of establishing communication with any one of a plurality of communications systems that provide respective cells that are overlapped, e.g., either of a ground (i.e., terrestrial) cellular communications system and a satellite mobile communications system, the mobile communications terminal equipment providing and using information on a communications channel selected when switching between the plurality of communications systems.

2. Description of the Prior Art

Referring next to FIG. 10, there is illustrated a block diagram showing the structure of a prior art mobile communications system in which mobile communications terminal equipment can establish connection with any one of a plurality of mobile communications systems. In the figure, reference numeral 1 denotes a base station for use with a mobile communications system A, numeral 2 denotes a cell provided by each base station 1, numeral 3 denotes a communications satellite for use with a mobile communications system B, and numeral 4 denotes a cell provided by the communications satellite 3. In general, the communications satellite 3 can provide a plurality of cells 4. Reference numeral 5 denotes mobile communications terminal equipment capable of establishing connection with either of the mobile communications systems A and B by switching between them, and numeral 6 denotes a control channel through which each of the base station 1 and the communications satellite 3 can transmit a variety of pieces of information to the mobile communications terminal equipment.

Next, a description will be made as to the operation of the prior art mobile communications system. Each of the base station 1 and the communications satellite 3 controls communications with the mobile communications terminal equipment 5 using the control channel thereof. Each of the base station 1 and the communications satellite 3 broadcasts information on control channels used by each respective mobile communications system, such as information on the frequencies of control channels used by neighboring cells which constitute a service area and the size of cells provided by each base station.

In each mobile communications system, the mobile communications terminal equipment 5 can switch between cells by changing channel parameters from the current use of transmission and reception channels to suitable channels selected for a neighboring cell based on the control channel information transmitted via the control channel and the radio condition of each neighboring cell, and complete the switching operation by performing a process of registering its location or the like.

On the other hand, when switching between the two mobile communications systems, the mobile communications terminal equipment 5 itself has to search for an available channel from all control channels defined within the new communications system to use because no control channel information about neighboring service cells covered by the new communications system is provided by the current communications system being used by the terminal. As a result, in most cases the user has to wait a few tens of seconds until connection with the new communications system is established. To be more specific, when switching between two mobile communications systems, the mobile communications terminal equipment 5 tries to establish connection with the new communications system via each of available channels one after another. The mobile communications terminal equipment 5 then evaluates the reception level and so on of each available channel, and repeats a process of searching for a channel with good receiving signal quality based on the evaluation result. The process is needed to establish stable communication between the mobile communications terminal equipment 5 and the new mobile communications system. In general, since there are many available channels to be evaluated, much time is spent in evaluating the reception levels of all available channels. Thus the mobile communications terminal equipment 5 cannot use the new mobile communications system during the evaluation of the reception levels of all available channels.

To overcome the above problem, it is conceivable that the mobile communications terminal equipment 5 pre-stores the correspondence of control channel information between all communications systems, so that the mobile communications terminal equipment 5 can switch to a new mobile communications system by receiving the corresponding channel of the new mobile communications system. However, in the case that a communications satellite in the mobile communications system B of FIG. 10 is not a geostationary satellite, each of the cells provided by the communications satellite moves with time even though the mobile communications terminal equipment 5 is stationary. Thus, the correspondence of control channel information cannot be obtained.

SUMMARY OF THE INVENTION

The present invention is made to overcome the above problem. It is therefore an object of the present invention to provide a mobile communications system in which mobile communications terminal equipment, which can establish communication with two or more mobile communications systems, can perform a process of switching between two mobile communications systems in a short time.

In accordance with one aspect of the present invention, there is provided a mobile communications system including mobile communications terminal equipment capable of establishing communication with two or more different mobile communications systems including the mobile communications system by switching among the mobile communications systems, and at least a base station that can establish communication with the mobile communications terminal equipment, the base station including a transmitting unit for transmitting channel information on the other mobile communications systems to the mobile communications terminal equipment, and the mobile communications terminal equipment including a channel information storage unit for receiving and storing the channel information on the other mobile communications systems from the base station, the mobile communications terminal equipment being able to establish connection with one of the other mobile communications systems based on the channel information when needed. Accordingly, the mobile communications terminal equipment can speedily switch to another mobile communications system based on the received channel information for the other communications systems.

In accordance with a preferred embodiment of the present invention, the base station includes a channel information storage unit for storing the channel information for the other mobile communications systems, the storage unit extracting the channel information for each of a plurality of cells provided by the base station so that cells illuminated by extracted corresponding channels cover each of the plurality of cells and the vicinity of each of the plurality of cells, from the channel information on the other mobile communications systems, and storing the extracted channel information therein. Accordingly, when switching to another mobile communications system, the mobile communications terminal equipment can reduce the time required for performing a communications channel searching operation.

In accordance with another preferred embodiment of the present invention, the mobile communications terminal equipment includes a unit for assigning priorities to the other mobile communications systems other than the mobile communications system. When switching from the mobile communications system to another mobile communications system, the mobile communications terminal equipment establishes connection with one of the other mobile communications systems according to their priorities. Accordingly, the usefulness of the mobile communications terminal equipment is enhanced when switching among a number of communications systems.

In accordance with another preferred embodiment of the present invention, the channel information is a set of cell numbers assigned to cells provided by the other mobile communications systems. The mobile communications terminal equipment includes a channel parameter table including, as each element, a cell number and a set of corresponding channel parameters, and can establish connection with one of the other mobile communications systems by retrieving a set of channel parameters from the channel parameter table based on the channel information. Accordingly, the structure of the system can be simplified because each of the plurality of cell numbers transmitted from the base station to the mobile communications terminal equipment represents corresponding channel information.

In accordance with another aspect of the present invention, there is provided a ground cellular communications system including a mobile communications terminal equipment capable of switching between the ground cellular communications system and either a mobile satellite communications system or another ground cellular communications system to establish communication with one of them, and at least a base station for use with the ground cellular communications system, with which the mobile communications terminal equipment can establish communication, the base station including a cell location storage unit for storing the locations of cells provided by the mobile satellite communications system and the other ground cellular communications system, a cell extraction unit for extracting some cells located either within a cell provided by the ground cellular communications system or in the vicinity of the cell from all the cells provided by the mobile satellite communications system and the other ground cellular communications system based on the cell locations stored in the cell location storage unit, and a channel information transmitting unit for transmitting channel information on the cells extracted by the cell extraction unit to the mobile communications terminal equipment, and the mobile communications terminal equipment including a channel information storage unit for receiving and storing the channel information from the base station, the mobile communications terminal equipment establishing connection with either the mobile satellite communications system or the other ground cellular communications system based on the channel information stored in the channel information storage unit thereof when needed. Accordingly, the mobile communications terminal equipment can speedily switch to either the mobile satellite communications system or the other ground cellular communications system based on the channel information on the mobile satellite communications system and the other ground cellular communications system, which is provided by the ground cellular communications system.

In accordance with a preferred embodiment of the present invention, the cell location storage unit computes the locations of cells provided by the mobile satellite communications system based on orbit information on one or more Earth-orbiting satellites, and stores the cell locations therein. Accordingly, the cell location information transmitted from the mobile satellite communications system to the ground cellular communications system can be simplified.

In accordance with a further aspect of the present invention, there is provided a mobile satellite communications system including a mobile communications terminal equipment capable of switching between the mobile satellite communications system and either a ground cellular communications system or another mobile satellite communications system to establish communication with one of them, and at least a base station for use with the mobile satellite communications system, with which the mobile communications terminal equipment can establish communication, the base station including a cell location storage unit for storing the locations of cells provided by the ground cellular communications system, a cell extraction unit for extracting some cells located either within a cell provided by the mobile satellite communications system or in the vicinity of the cell from all the cells provided by the ground cellular communications system and the other mobile satellite communications system based on the cell locations stored in the cell location storage unit, and a channel information transmitting unit for transmitting channel information on the cells extracted by the cell extraction unit to the mobile communications terminal equipment, and the mobile communications terminal equipment including a channel information storage unit for receiving and storing the channel information from the base station, the mobile communications terminal equipment establishing connection with either the ground cellular communications system or the other mobile satellite communications system based on the channel information stored in the channel information storage unit thereof when needed. Accordingly, the mobile communications terminal equipment can speedily switch to either the ground cellular communications system or the other mobile satellite communications system based on the channel information on the ground cellular communications system and the other mobile satellite communications system, which is provided by the mobile satellite communications system.

Further objects and advantages of the present invention will be apparent from the following description of the preferred embodiments of the invention as illustrated in the accompanying drawings.

BRIEF DESCRIPTION OF THE DRAWINGS

FIG. 3 is a diagram showing an example of a logical format of the channel information on other communications systems that is to be sent over a control channel by a base station included in the mobile communications system according to the first embodiment of the present invention;

FIG. 7 is a diagram showing an example of a logical format of the channel information on another communications system that is to be sent over a control channel by a base station included in the mobile communications system according to the second embodiment of the present invention;

FIG. 8 is a diagram showing a channel parameter table used by the mobile communications terminal equipment of the mobile communications system according to the second embodiment of the present invention;

DETAILED DESCRIPTION OF THE PREFERRED EMBODIMENTS

First Embodiment

Figure 1:
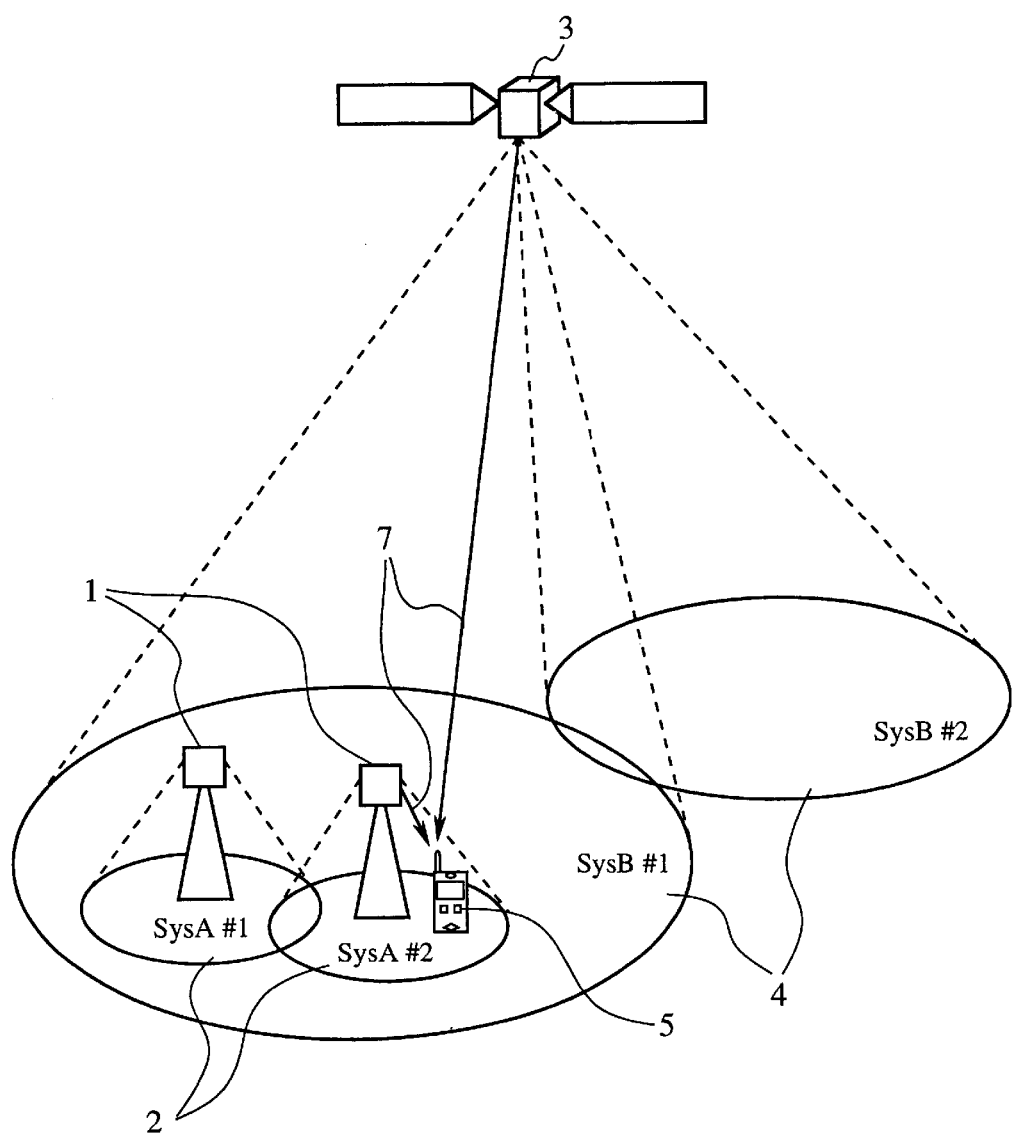
FIG. 1 is a schematic diagram showing the whole of a mobile communications system according to a first embodiment of the present invention.

Referring next to FIG. 1, there is illustrated a schematic diagram showing the whole of a mobile communications system according to a first embodiment of the present invention. In the figure, reference numeral 1 denotes a radio base station for use with a communications system A, numeral 2 denotes a cell provided by each radio base station 1, numeral 3 denotes a communications satellite for use with a mobile communications system B, and numeral 4 denotes a cell provided by each communications satellite 3. Reference numeral 5 denotes mobile communications terminal equipment capable of establishing connection with either of the communications systems A and B by switching between them, and numeral 7 denotes a control channel through which each of the communications systems A and B can transmit a variety of pieces of information to the mobile communications terminal equipment 5. Each of the communications systems A and B can transmit both information on control channels for use with the communications system itself and information on control channels for use with the other communications system to the mobile communications terminal equipment 5. For example, the communications system B provides both information on control channels for use with the communications system B and information on control channels for use with the other communications system A for the mobile communications terminal equipment through the control channel 7. As shown in FIG. 1, the communications system A can be a ground cellular system and the communications system B can be a mobile satellite communications system. As an alternative, both the communications systems A and B can be either ground cellular systems or mobile satellite communications systems.

Figure 2:
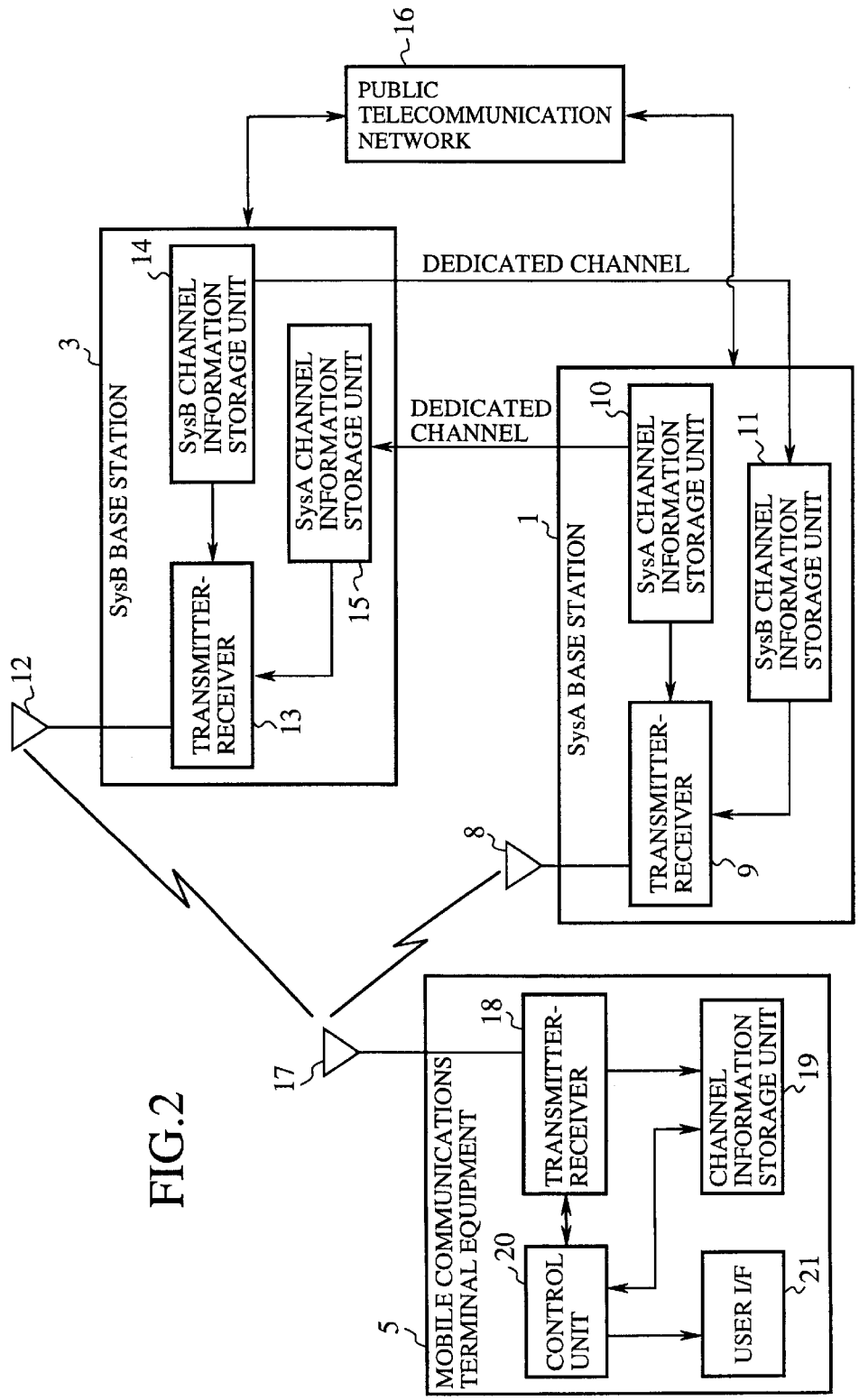
FIG. 2 is a block diagram showing the structure of the mobile communications system according to the first embodiment of the present invention.

Referring next to FIG. 2, there is illustrated a block diagram showing the structure of the mobile communications system according to the first embodiment. Each base station 1 for use with the communications system A includes an antenna 8, a transmitter-receiver 9, a SysA channel information storage unit 10 for storing information on control channels for use with the communications system A, and a SysB channel information storage unit 11 for storing information on control channels for use with the communications system B that is a communications system other than the communications system A. Each base station 3 for use with the communications system B includes an antenna 12, a transmitter-receiver 13, a SysB channel information storage unit 14 for storing information on control channels for use with the communications system B, and a SysA channel information storage unit 15 for storing information on control channels for use with the communications system A that is a communications system other than the communications system B. The communications system B can assume that each satellite as shown in FIG. 1 is either a base station or a relay station. When each satellite can be a base station, the base station 3 of FIG. 2 represents the satellite. In contrast, when the satellite can be a relay station, the base station 3 of FIG. 2 represents a ground station. In FIG. 2, reference numeral 16 denotes a network such as a public telecommunication network, to which either of the communications systems A and B can be connected so that the user that uses the mobile communications terminal equipment can establish communication with users on the public telecommunication network or the like. The mobile communications terminal equipment 5 includes an antenna 17, a transmitter-receiver 18, a channel information storage unit 19 for storing control channel information from the base station 1 or 3, a control unit 20 for controlling the transmitter-receiver 18, and a user interface 21 constructed of a keypad or the like.

Each base station 1 for use with the communications system A can transmit information on control channels for the communications system A stored in the SysA channel information storage unit 10, by way of the transmitter-receiver 9 and the antenna 8, to the mobile communications terminal equipment 5. The mobile communications terminal equipment 5 can receive the channel information from the base station 1 by way of the antenna 17 and the transmitter-receiver 18 while communicating with the communications system A, and then store the received control channel information in the channel information storage unit 19.

In addition, according to the present invention, since the base station 1, which has already established connection with the mobile communications terminal equipment 5, can transmit the control channel information on control channels for use with the communications system B stored in the SysB channel information storage unit 11, by way of the transmitter-receiver 9 and the antenna 8, to the mobile communications terminal equipment 5, the mobile communications terminal equipment 5 can store the control channel information on the communications system B from the base station 1 in the channel information storage unit 19 while communicating with the communications system A. Both the SysA control channel information and the SysB control channel information can be transmitted, by way of the same control channel, to the mobile communications terminal equipment. As an alternative, the SysA control channel information and the SysB control channel information can be transmitted, by way of different control channels, to the mobile communications terminal equipment.

The control channel information stored in the SysB channel information storage unit 11 of each base station 1 for use with the communications system A is information that has been transmitted to each base station 1 for use with the communications system A from one base station 3 for use with the communications system B. The path for the transmission of the SysB channel information can be a dedicated channel as shown in FIG. 2. Alternatively, the path can be the public telecommunication network 16. Switching offices (not shown in FIG. 2) are located between the base stations 1 and 3 and the public telecommunication network, for exchanging data between different communications systems and procedures.

In this embodiment, the control channel information on the communications system B stored in the SysB channel information storage unit 11 of each base station 1 is transmitted from one base station 3 to the base station 1, as shown in FIG. 2. As an alternative, a control station (not shown) that exercises control over the group of base stations 3 can transmit the control channel information on the communications system B to the base station 1. To this end, the control station is located either on the way of the dedicated channels or between the group of base stations 3 and the public telecommunication network. In this case, the control station that monitors the control channel information on the group of base stations makes it possible to transmit the control channel information to another control station for use with the other communications system, thus eliminating a complicated procedure by which each of the plurality of base stations individually transmits the control channel information on the communications system to which it belongs to another base station for use with the other communications system.

Each base station 3 for use with the communications system B as shown in FIG. 2 has the same structure as each base station 1 for use with the communications system A. Each base station 3 can transmit both the control channel information on the communications system B stored in the SysB channel information storage unit 14 and the control channel information on the communications system A stored in the SysA channel information storage unit 15 to the mobile communications terminal equipment 5.

Referring next to FIG. 3, there is illustrated a diagram showing an example of a logical format of the control channel information on one or more different communications systems to be sent over the control channel. In the figure, the number of systems represents the number of communications systems with which the mobile communications terminal equipment 5 can establish communication, system ID represents the number assigned to each communications system, and the number of channels represents the number of channels included with each communications system identified by each system ID. The control channel information further includes parameters defining each of the plurality of channels included with each communications system. In the example as shown in FIG. 3, the frequency and TDM offset are defined as the parameters for each of the plurality of channels. The mobile communications terminal equipment 5 receives the control channel information whenever necessary, and then updates the contents of the channel information storage unit 19. The mobile communications terminal equipment 5 uses a combination of the frequency and TDM offset to establish connection with a communications system via a channel. The mobile communications terminal equipment 5 sequentially reads the information on a combination of the frequency and TDM offset out of the channel information storage unit 19 and tries to establish connection with a communications system. For example, when the number of systems is 3, the mobile communications terminal equipment 5 retrieves one system ID and the number of channels for the system ID, and sequentially extracts the information on a combination of the frequency and TDM offset from the channel information storage unit a maximum number of times corresponding to the number of channels so as to perform a receiving searching operation until it can establish connection with the communications system. When the mobile communications terminal equipment 5 cannot establish connection with the communications system after it has completed the receiving searching operation the maximum number of times corresponding to the number of channels, it halts the process of establishing a connection with the communications system or retrieves another system ID and the number of channels for the other system ID, and similarly performs a receiving searching operation a maximum number of times corresponding to the number of channels until it can establish connection with the communications system.

In the example as shown in FIG. 3, the communications system of this embodiment uses combinations of the frequency and TDM offset as channel parameters, as previously mentioned, and implements multiple access with frequency-division multiplexing and time-division multiplexing. When utilizing code-division multiplexing as a method of implementing multiple access, unique codes defined by code-division multiplexing are also used as channel parameters. When utilizing frequency hopping as a method of implementing multiple access, unique codes defined by frequency hopping are also used as channel parameters.

In general, control channel information transmitted by a base station can be either the information on the base station or the information on a neighboring base station in the vicinity of the former base station. The mobile communications terminal equipment 5 can continuously maintain the current communication even when it moves from a cell to another cell if it has already acquired the control channel information on the area to where it has moved. Thus, it is desirable that the received control channel information on another communications system is the information that the mobile communications terminal equipment 5 needs when switching to the other communications system, and that is associated with the area where it is now located. To this end, each base station included with one communications system extracts the control channel information on each of a plurality of cells provided by each base station so that cells illuminated by extracted corresponding channels cover each of the plurality of cells and the vicinity of each of the plurality of cells, from the received control channel information. Each base station can easily carry out the extraction process according to the geographical relationship between the cell covered by each base station and the cells covered by other base stations for use with the other communications system. If the individual extraction process by each base station increases in complexity, a control station that controls the group of base stations can get the control channel information on the plurality of other base stations for use with the other communications system, which each base station has to transmit by way of the control channel if no control station is present, thus simplifying the structure of the communications system of this embodiment. The control station can be located either on the dedicated channels as shown in FIG. 2, or between the public telecommunication network and the group of base stations, to receive the control channel information on each of the plurality of other communications systems.

Figure 4:
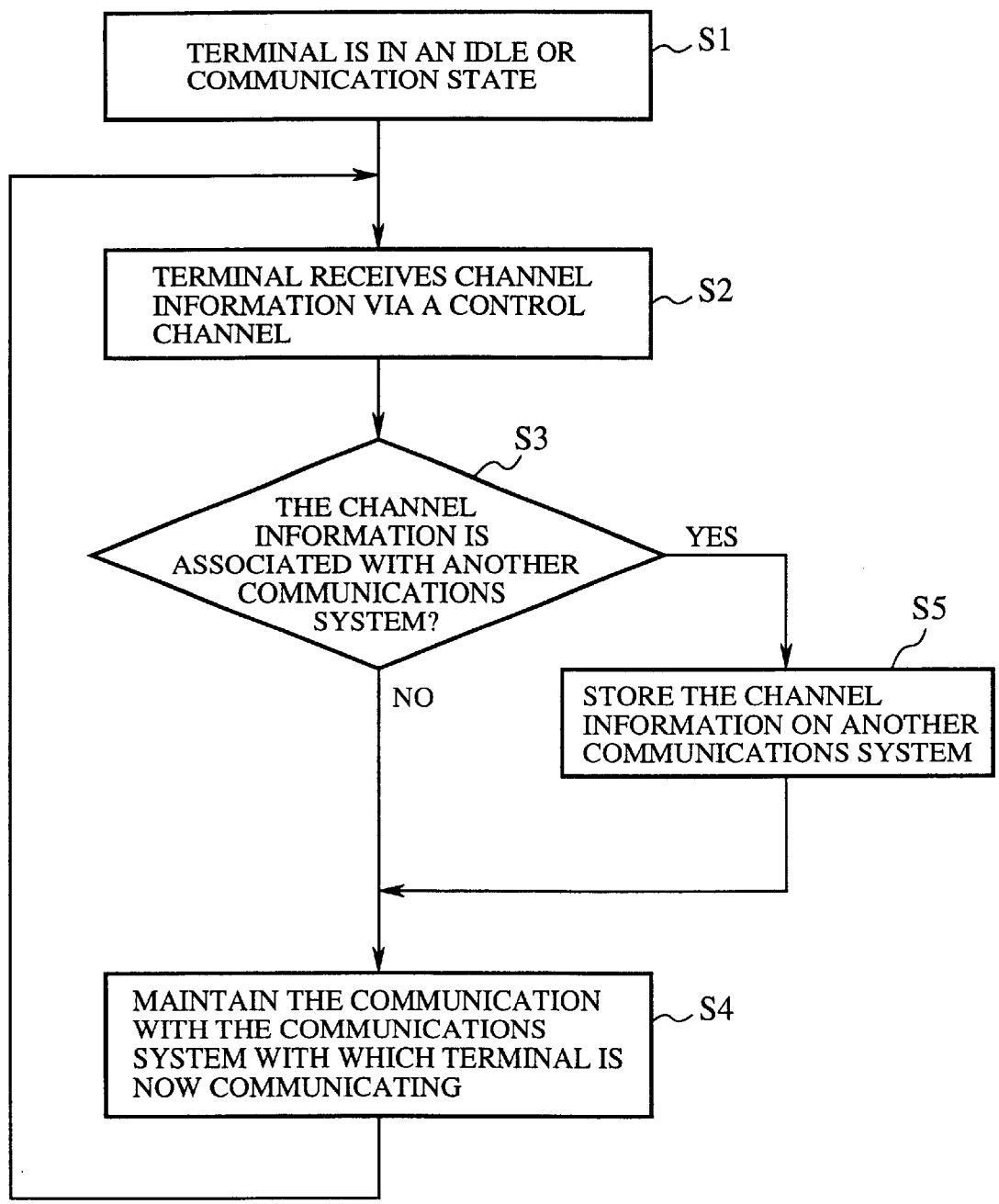
FIG. 4 is a flow diagram showing a flow of a process to be done prior to a process of switching between mobile communications systems by the mobile communications system according to the first embodiment of the present invention.

Next, a description will be made as to a process to be done prior to a process of switching between communications systems, and the switching process. FIG. 4 is a flow diagram showing a flow of the process to be done prior to the switching process, and FIG. 5 is a flow diagram showing a flow of the switching process.

As shown in FIG. 4, the mobile communications terminal equipment 5, in step S1, has established a connection with one communications system, and is then held in either an idle state in which it waits for communication with another terminal or a state in which it maintains the communication with another terminal, before it switches between the communications system and another communications system. The mobile communications terminal equipment 5 then, in step ST2, receives control channel information by way of the control channel. The mobile communications terminal equipment 5, in step ST3, determines whether the control channel information is the one on the communications system with which it is now communicating or the one on another communications system, and branches according to the determination result. If the received control channel information is the one on the communications system with which the mobile communications terminal equipment 5 is now communicating, the mobile communications terminal equipment 5, in step S4, maintains the communication state in which it is now communicating with the communications system, and then returns to step S2 in which it will receive control channel information again by way of the control channel. In contrast, if the control channel information received in step S2 is the one on another communications system, the mobile communications terminal equipment 5, in step S5, stores the received control channel information into the channel information storage unit 19 while categorizing the control channel information according to which communications system is associated with the control channel information. The mobile communications terminal equipment 5 then, in step S4, maintains the communication state in which it is now communicating with the communications system, and then returns to step S2 in which it will receive control channel information again by way of the control channel.

Figure 5:
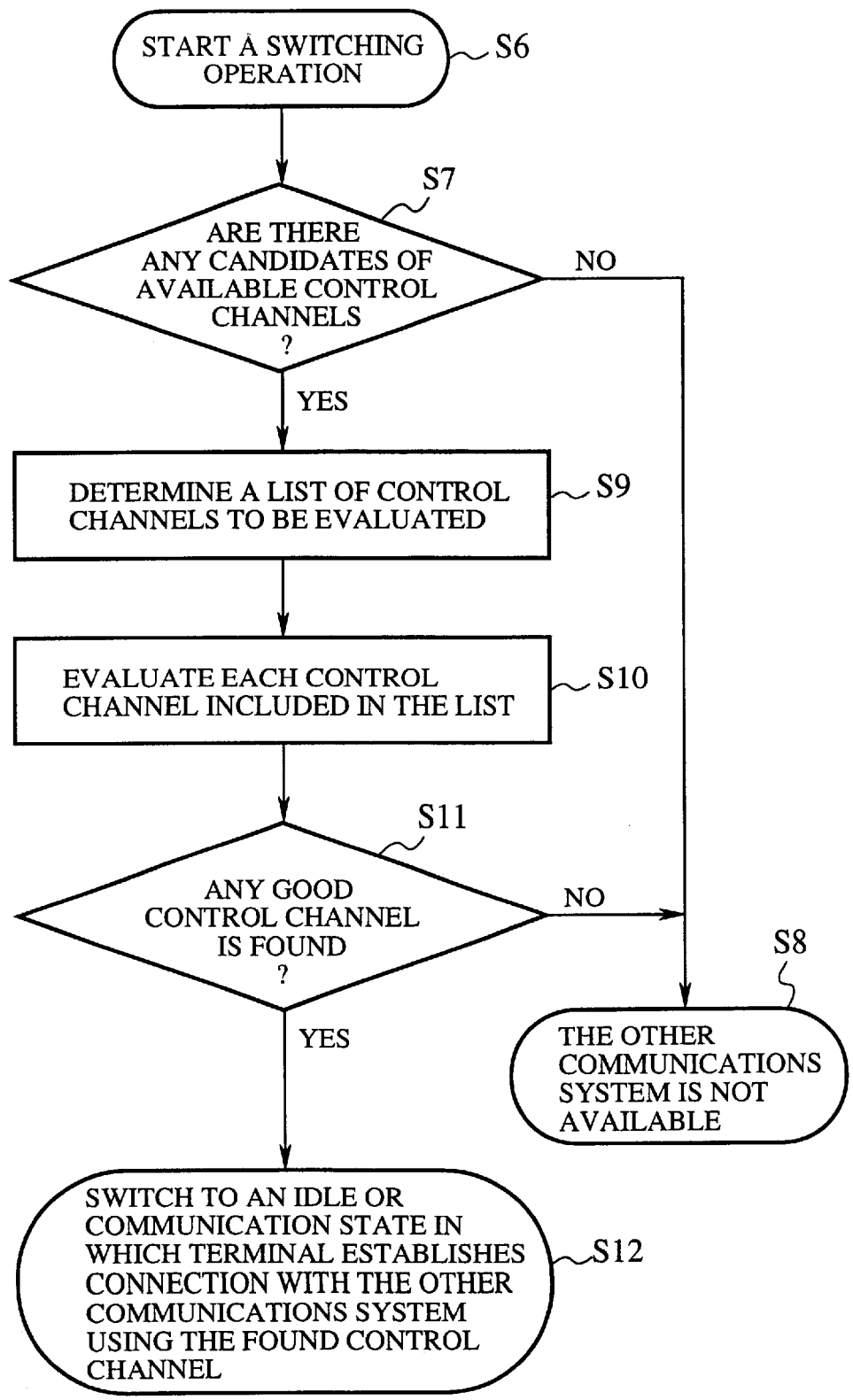
FIG. 5 is a flow diagram showing a flow of the switching process done by the mobile communications system according to the first embodiment of the present invention.

The description will be directed to the flow of the switching process preformed by the communications system of the first embodiment as shown in FIG. 5. The mobile communications terminal equipment 5, in step S6, starts switching from the communications system with which it is now communicating to another communications system. The mobile communications terminal equipment 5 can start the switching operation when it receives a request from the user by way of the user interface 21 of the mobile communications terminal equipment 5 as shown in FIG. 2. Alternatively, the control unit 20 can cause the mobile communications terminal equipment 5 to start the switching operation. For example, when the mobile communications terminal equipment 5 provides a function of automatically switching from the communications system with which it is communicating to another communications system if the channel quality becomes poor, the control unit 20 does. After the switching operation is triggered in step S6, the mobile communications terminal equipment 5 checks whether or not the control channel information on the specified other communications system is already stored in the channel information storage unit 19 thereof, in step S7. If the checking result indicates that the control channel information on the specified other communications system is not stored in the channel information storage unit 19, the mobile communications terminal equipment 5 advances to step S8 in which it determines that the other communications system is not available and then finishes the switching process. After that, the mobile communications terminal equipment 5 can inform the user that the other communications system is not available. As an alternative, the mobile communications terminal equipment 5 can further perform the process of determining whether or not another communications system is available. In the former case, the mobile communications terminal equipment 5 can switch to another communications system according to an explicit direction by the user. In the latter case, the mobile communications terminal equipment 5 can automatically perform the process of establishing a connection with another communications system based on the contents of the channel information storage unit 19, therefore requiring no involvement by the user and hence improving the convenience to the user.

In contrast, if the checking result in step S7 indicates that the control channel information on the specified other communications system is stored in the channel information storage unit 19 of the mobile communications terminal equipment 5, the mobile communications terminal equipment 5 advances to step S9 in which it defines available candidates for the frequency and TDM offset stored in an area identified by the system ID of the specified communications system as a list of control channels to be evaluated. The mobile communications terminal equipment 5 then, in step S10, tries in turn to receive information from the specified other communications system by way of each of the listed control channels, and checks whether or not each of the control channels is good by measuring so-called receiving signal quality, such as received power, bit error rate, and unique word detection status, and evaluating the measured receiving signal quality. The mobile communications terminal equipment 5, in step S11, branches according to the evaluation result done in step S10. When the mobile communications terminal equipment 5 can find a good control channel in performing step S10, it advances to step S12 in which it establishes a connection with the specified other communications system by way of the good control channel. In contrast, when the mobile communications terminal equipment 5 cannot find any good control channel in performing step S10, it advances to step S8 in which it determines that the other communications system is not available and then finishes the switching process. After that, the mobile communications terminal equipment 5 can inform the user that the other communications system is not available, as previously mentioned. As an alternative, the mobile communications terminal equipment 5 can further perform the process of determining whether or not another communications system is available, as previously mentioned.

There is a possibility that a plurality of communications systems with which the mobile communications terminal equipment 5 of the present invention can communicate include one or more communications systems to which the present invention is not applied. In such a case, the communications system of the present invention enables the mobile communications terminal equipment 5 to determine whether or not the candidate is a communications system to which the present invention is not applied by checking whether or not the system ID of the candidate is stored therein without having to check the control channel information stored in the channel information storage unit 19, by disabling each base station to transmit the system IDs of communications systems to which the present invention is not applied.

Preferably, the mobile communications terminal equipment 5 can have a means for allowing the user to assign priorities to communications systems and for storing the priorities. In this variant, the mobile communications terminal equipment 5 can switch from the communications system with which it is communicating to another communications system according to the priorities, thus improving the convenience to the user.

Second Embodiment

Figure 6:
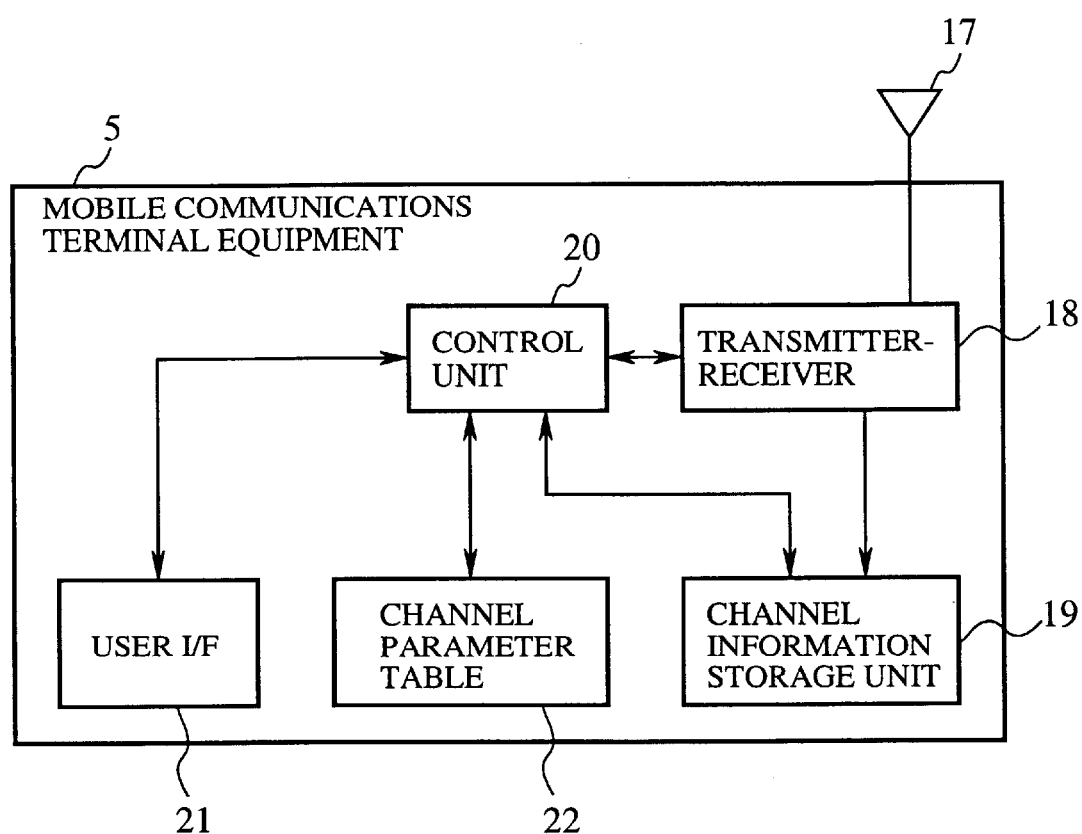
FIG. 6 is a block diagram showing the structure of an example of mobile communications terminal equipment of a mobile communications system according to a second embodiment of the present invention.

Referring next to FIG. 6, there is illustrated a block diagram showing the structure of another example of the mobile communications terminal equipment of the communications system according to the present invention. In FIG. 6, reference numeral 22 denotes a channel parameter table.

In the communications system according to the first embodiment, each base station for use with a specific communications system can transmit a plurality of sets of channel parameters, such as the frequencies and TDM offsets for respective channels, as the control channel information on another communications system, as illustrated above. As an alternative, each base station can transmit a plurality of logical numbers respectively mapped into the plurality of sets of channel parameters, e.g., a set of cell numbers as shown in FIG. 7, to the mobile communications terminal equipment 5. The mobile communications terminal equipment 5 can get a plurality of sets of channel parameters based on a plurality of available cell numbers transmitted thereto. In the case where the mobile communications terminal equipment 5 receives a plurality of available cell numbers associated with another communications system from each base station, the control unit 20 searches through the channel parameter table 22 for each of a plurality of units of control channel information corresponding to each of the plurality of available cell numbers stored in the channel information storage unit 19 when the mobile communications terminal equipment 5 establishes connection with the other communications system. According to the control channel information, the control unit 20 activates the transmitter-receiver 18. The channel parameter table 22 stores the control channel information on each channel, such as the frequency and TDM offset, corresponding to each cell number. An example of the channel parameter table 22 is shown in FIG. 8. When utilizing code-division multiplexing as a method of implementing multiple access, unique codes defined by code-division multiplexing are also stored as control channel information in the channel parameter table 22. When utilizing frequency hopping as a method of implementing multiple access, unique codes defined by frequency hopping are also stored as control channel information in the channel parameter table 22.

Third Embodiment

Figure 9:
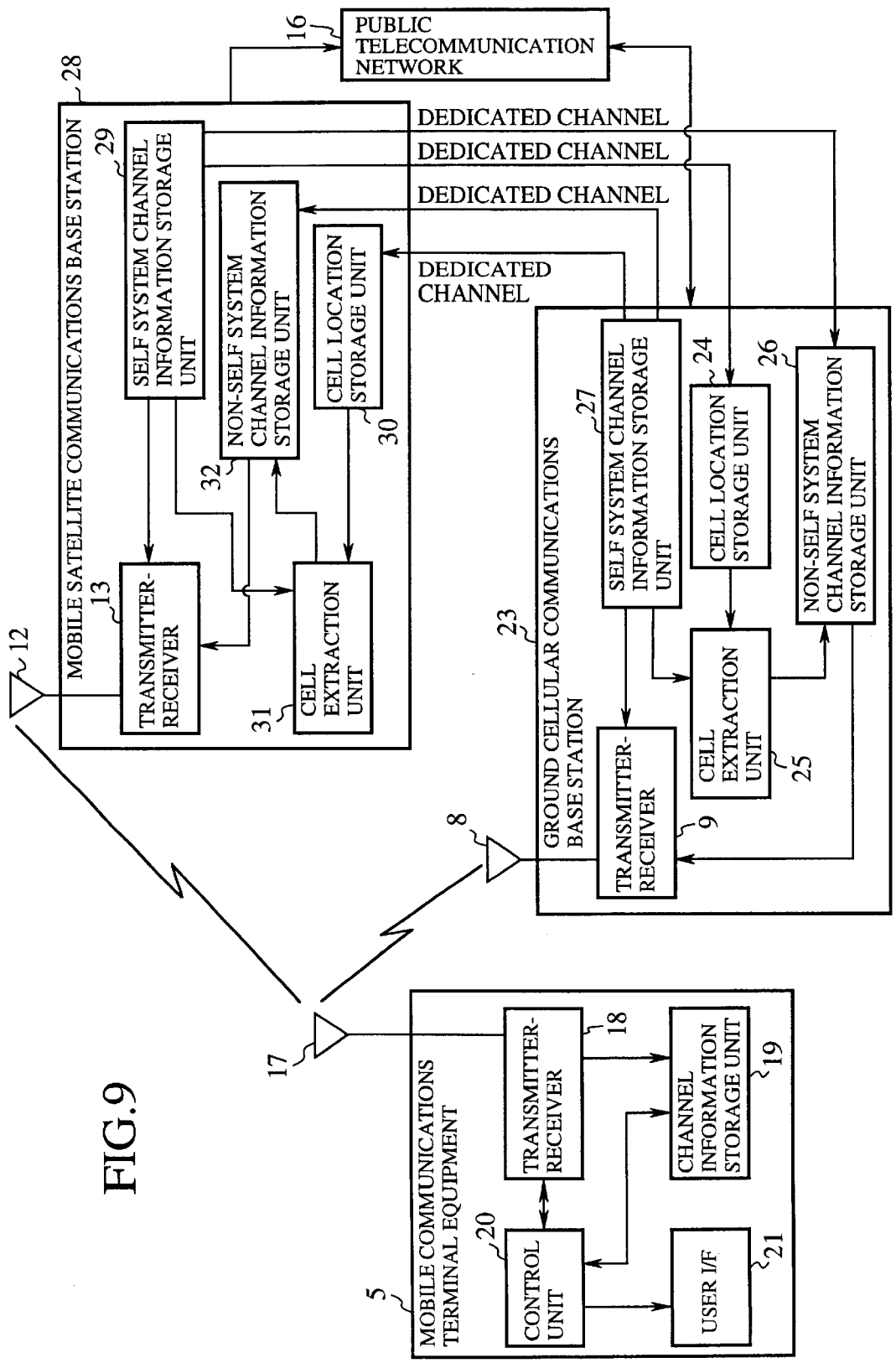
FIG. 9 is a schematic diagram showing the structure of a mobile communications system according to a third embodiment of the present invention.
Figure 10:
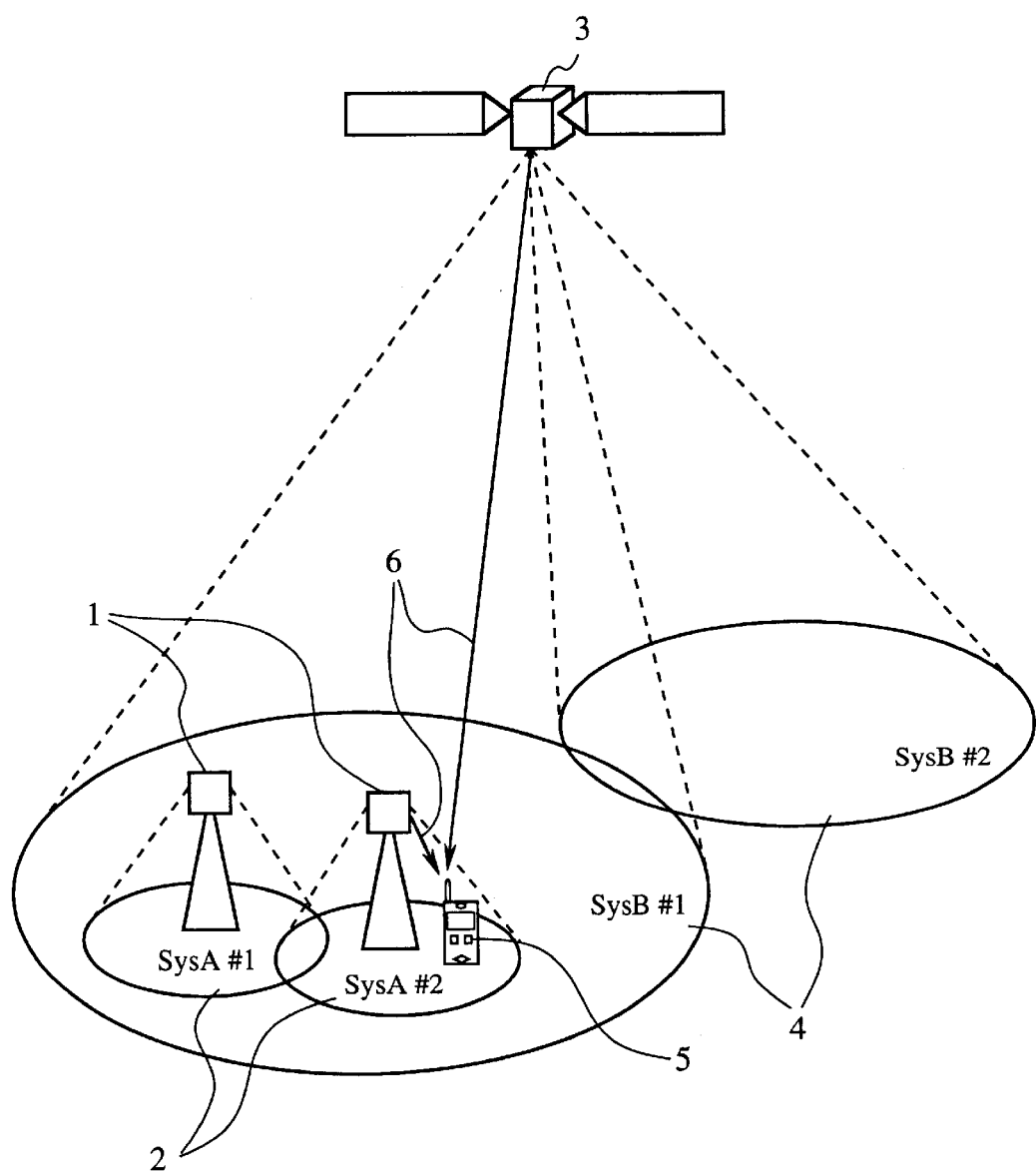
FIG. 10 is a schematic diagram showing the whole of a prior art mobile communications system.

Referring next to FIG. 9, there is illustrated a block diagram showing the structure of another example of the communications system according to the present invention. In the figure, reference numeral 23 denotes a ground cellular communications base station, numeral 24 denotes a cell location storage unit for storing the locations of cells provided by a mobile satellite communications system that is another communications system, numeral 25 denotes a cell extraction unit for extracting some cells located either within a cell provided by the ground cellular communications base station 23 or in the vicinity of the cell from all the cells provided by the mobile satellite communications system, based on the cell location information stored in the cell location storage unit 24, numeral 26 denotes a non-self system channel information storage unit for transferring the control channel information on the cells extracted by the cell extraction unit 25 to a transmitter-receiver 9, numeral 27 denotes a self system channel information storage unit for storing the control channel information on the communications system to which the ground cellular communications base station 23 belongs, numeral 28 denotes a mobile satellite communications base station, numeral 29 denotes a self system channel information storage unit for storing the control channel information on the communications system to which the mobile satellite communications base station 28 belongs, numeral 30 denotes a cell location storage unit for storing the locations of the cells provided by the ground cellular communications system that is another communications system, numeral 31 denotes a cell extraction unit for extracting some cells located either within a cell provided by the mobile satellite communications base station 28 or in the vicinity of the cell from the cells provided by the ground cellular communications system, based on the cell location information stored in the cell location storage unit 30, and numeral 32 denotes a non-self system channel information storage unit for transferring the control channel information on the cells extracted by the cell extraction unit 31 to a transmitter-receiver 13. In FIG. 9, the other components designated by the same reference numerals as shown in FIG. 2 are the same as those of the first embodiment.

Mobile satellite communications include communications between a communications satellite in a geostationary orbit and a ground moving unit and communications between a communications satellite in an earth orbit and a ground moving unit. In the latter case, as the communications satellite moves with respect to the Earth's surface, the locations of cells radially arranged on the Earth's surface with respect to the communications satellite are varied with time. Each ground cellular communications base station 23 can follow the variation in the cell locations to extract some cells which are provided by the mobile satellite communications system and which are located either within the cell covered by each ground cellular communications base station 23 or in the vicinity of the cell, and then transmit the control channel information on the extracted cells to the mobile communications terminal equipment 5.

The cell locations that vary with the movement of each communications satellite for use with the mobile satellite communications system are stored in the cell location storage unit 24. The cell extraction unit 25 extracts some cells located either within the cell provided by the ground cellular communications base station 23 or in the vicinity of the cell from all cells provided by the mobile satellite communications system. The non-self system channel information storage unit 26 then sends the control channel information on the cells extracted by the cell extraction unit 25 to the transmitter-receiver 9. In the example of FIG. 9, the control channel information stored in the non-self system channel information storage unit 26 is the one that has been transmitted from one or more mobile satellite communications base stations 28. As an alternative, the control channel information stored in the non-self system channel information storage unit 26 can be the one that has been transmitted from a control station or the like for monitoring the movement of each communications satellite included with the mobile satellite communications system and the locations of cells covered by each communications satellite. A plurality of dedicated channels, through which both the information on the cell locations and the control channel information are respectively transmitted, are shown in FIG. 9, only for making the explanation of the structure of the communications system of the second embodiment clear. It is unnecessary to provide individual dedicated channels for transmission of those units of information. In other words, the plurality of dedicated channels can be merged into a single dedicated channel. As an alternative, those units of information can be transmitted over the public telecommunication network if the frequency with which the data are transmitted is low. The mobile communications terminal equipment 5 can receive the control channel information on the mobile satellite communications system transmitted thereto from each ground cellular communications base station 23. When switching from the ground cellular communications system to the mobile satellite communications system, the mobile communications terminal equipment 5 can retrieve and use the control channel information on the mobile satellite communications system transmitted thereto from each ground cellular communications base station 23 from the channel information storage unit 19, thus decreasing the time required for performing the switching operation. The mobile communications terminal equipment 5 performs the process of switching between the ground cellular communications system and the mobile satellite communications system in the same way as described in First Embodiment.

In each base station included with the ground cellular communications system, the sequence of cell extraction processes, which can be done by the cell location storage unit 24 and the cell extraction unit 25 in the ground cellular communications base station, and the process of retrieving the control channel information on extracted cells, which can be done by the non-self system channel information storage unit 26 in the ground cellular communications base station, are carried out in the same way. As an alternative, the extraction and retrieve processing functions can be taken out of the functions performed by each base station by offloading the processing functions from each base station and placing them on a control station for use with the ground cellular communications system, for example, thus decreasing the complexity of each base station.

When each ground cellular communications base station 23 cannot receive the cell location information from the self system channel information storage unit 29 of each mobile satellite communications base station 28 for the reason that a dedicated channel cannot be provided between each mobile satellite communications base station 28 and each ground cellular communications base station 23, for example, each ground cellular communications base station 23 can be so constructed as to compute the orbit of each communications satellite to get the cell location information. To that end, the information on the orbit of each communications satellite is provided for the cell location storage unit 24 of FIG. 9 in advance, to enable each ground cellular communications base station 23 to compute the locations of cells provided by each communications satellite. The information on the orbit of each communications satellite includes the altitude of each communications satellite, the inclination of the orbit, the time at the descending node, and the oblateness of the orbit, and so on. Each ground cellular communications base station can compute the current position of each communications satellite on the orbit and then compute the locations of the cells radially arranged on the Earth's surface with respect to each communications satellite. The cell extraction unit 25 of each ground cellular communications base station 23 extracts some cells located either within a cell provided by each ground cellular communications base station 23 or in the vicinity of the cell based on the computed locations of all cells covered by the mobile satellite communications system in the same way as mentioned above. The non-self system channel information storage unit 26 then sends the control channel information on the cells extracted by the cell extraction unit 25 to the transmitter-receiver 9 in the same way as mentioned above. Those processes of computing the orbit of each communications satellite from the orbit information and then computing the locations of all the cells provided by the mobile satellite communications system from the computed current position of each communications satellite on the orbit may be done in each base station for use with the ground cellular communications system. As an alternative, the orbit computation and cell location computation functions can be taken out of the functions performed by each base station by offloading the computation functions from each base station and placing them on a control station for the ground cellular communications system, for example, thus decreasing the complexity of each base station.

Next, a description will be made as to the operation of each mobile satellite communications base station 28. Each mobile satellite communications base station 28 can be either a communications satellite or a ground station. In the latter case, each communications satellite can be only a relay station.

In mobile satellite communications system using one or more Earth-orbiting communications satellites, the locations of cells radially arranged on the Earth's surface with respect to each communications satellite are varied with time as each Earth-orbiting satellite moves. Accordingly, the locations of cells provided by each ground cellular communications base station for use with another communications system vary with time with resect to the locations of the cells provided by each mobile satellite communications base station 28. In accordance with the second embodiment of the present invention, each mobile satellite communications base station 28 extracts some cells located either within the cell provided by each mobile satellite communications base station or in the vicinity of the cell from all the cells provided by the ground cellular communications system, and then transmits the control channel information on the extracted cells to the mobile communications terminal equipment 5.

The cell locations that vary with the movement of each communications satellite for use with the mobile satellite communications system are stored in the self system channel information storage unit 29. The information on the cell locations stored in the self system channel information storage unit varies with time. On the other hand, the locations of the cells provided by the ground cellular communications system are transferred, by way of a dedicated channel or the public telecommunication network, to the cell location storage unit 30, and are then stored in the cell location storage unit. In general, since the locations of the cells provided by the ground cellular communications system are fixed, the cell location storage unit 30 can store the cell location information in advance. Unless the locations of the cells provided by the ground cellular communications system are fixed, each mobile satellite communications base station has to receive the cell location information by way of a dedicated channel or the public telecommunication network. The cell extraction unit 31 extracts some cells located either within the cell provided by the cells whose locations are stored in the self system channel information storage unit 29, or in the vicinity of the cell from all the cells provided by the ground cellular communications system, based on the cell location information stored in the cell location storage unit 30. The non-self system channel information storage unit 32 then sends the control channel information on the cells extracted by the cell extraction unit 31 to the transmitter-receiver 13. The non-self system channel information storage unit 32 has received the control channel information on the cells provided by the ground cellular communications system in advance. The mobile communications terminal equipment 5 can receive the control channel information on the ground cellular communications system transmitted thereto from each mobile satellite communications base station 28. When switching from the mobile satellite communications system to the ground cellular communications system, the mobile communications terminal equipment 5 can retrieve and use the control channel information on the ground cellular communications system transmitted thereto from each mobile satellite communications base station 28 from the channel information storage unit 19, thus decreasing the time required for performing the switching operation. The mobile communications terminal equipment 5 performs the process of switching between the ground cellular communications system and the mobile satellite communications system in the same way as described in First Embodiment.

In each mobile satellite communications base station, the sequence of cell extraction processes, which can be done by the cell location storage unit 30 and the cell extraction unit 31 in the mobile satellite communications base station, and the process of retrieving the control channel information on extracted cells, which can be done by the other channel information storage unit 32 in the mobile satellite communications base station, are carried out in the same way. As an alternative, the extraction and retrieve processing functions can be taken out of the functions performed by each mobile satellite communications base station by offloading the processing functions from each mobile satellite communications base station and placing them on a control station for the mobile satellite communications system, for example, thus decreasing the complexity of each mobile satellite communications base station.

The above description of the first through third embodiments is directed to the case where the communications system other than the mobile satellite communications system is a ground cellular communications system. The present invention is alternatively applied to the case where the other communications system is a mobile satellite communications system, too. In this case, the locations of cells provided by the other communications system vary with time as each communications satellite for the mobile satellite communications system moves, too. Each mobile satellite communications base station 28 has to get the information on the locations of the cells provided by the other mobile satellite communications system, which is the other communications system, every moment. As an alternative, each mobile satellite communications base station 28 has to compute the locations of the cells based on the information on the orbit of each communications satellite for the other mobile satellite communications system.

Numerous variants may be made in the above-mentioned embodiments. It is apparent that the information which the mobile communications terminal equipment 5 can get from each base station is not limited to the control channel information on the other communications system, and can be other information on the other communications system.

Furthermore, the mobile communications terminal equipment 5 can establish communication with one of three or more mobile communications systems including the mobile communications system involving the mobile communications terminal equipment 5. To this end, the mobile communications terminal equipment 5 receives the control channel information on the other mobile communications systems other than the mobile communications system involving the mobile communications terminal equipment 5 from each base station for use with the mobile communications system.

Many widely different embodiments of the present invention may be constructed without departing from the spirit and scope of the present invention. It should be understood that the present invention is not limited to the specific embodiments described in the specification, except as defined in the appended claims.

What is claimed is:

1. A first mobile communications system, comprising:

a mobile communications terminal capable of switching between at least two different mobile communications systems, including a first mobile communications system, and establishing communication with a mobile communications system to which said mobile communications terminal has switched; and at least one base station independent of a secondary medium and capable of establishing communication with said mobile communications terminal, said base station receiving channel information for other mobile communications systems and including transmitting means for transmitting said channel information to said mobile communications terminal;

said mobile communications terminal including channel information storage means for receiving and storing said channel information from said base station when said mobile communications terminal is in communication with said first mobile communications system, said mobile communications terminal being able to establish a communication connection with one of the other mobile communications systems based on the stored channel information when needed, wherein said base station includes channel information storage means for storing the channel information on the other mobile communications systems, said storage means extracting the channel information on each of a plurality of cells provided by said base station so that cells illuminated by extracted corresponding channels cover each of said plurality of cells and the vicinity of each of said plurality of cells, from said channel information on the other communications systems, and storing the extracted channel information therein.

2. The mobile communications system according to claim 1, wherein said mobile communications terminal includes means for assigning priorities to the other mobile communications systems other than said mobile communications system, and wherein when switching from said mobile communications system to another mobile communications system, said mobile communications terminal establishes connection with one of the other mobile communications systems according to their priorities.

3. The mobile communications system according to claim 1, wherein said channel information is a set of cell numbers assigned to cells provided by the other mobile communications systems, and wherein said mobile communications terminal includes a channel parameter table including, as each element, a cell number and a set of corresponding channel parameters, and can establish connection with one of the other mobile communications systems by retrieving a set of channel parameters from said channel parameter table based on said channel information.

4. A terrestrial cellular communications system, comprising:

mobile communications terminal capable of switching between said terrestrial cellular communications system and either a mobile satellite communications system or another terrestrial cellular communications system to establish communication with the switched-to system, and a base station independent of a secondary medium and including cell location storage means for storing locations of cells provided by said mobile satellite communications system and said other terrestrial cellular communications system, cell extraction means for extracting a plurality of cells located either within a cell provided by said terrestrial cellular communications system in which said mobile communications terminal is located, or in the vicinity of said cell, from all the cells provided by said mobile satellite communications system or said other terrestrial cellular communications system based on the cell locations stored in said cell location storage means, channel information storage means for storing channel information for cells having locations stored in said cell location storage means, and channel information transmitting means for transmitting stored channel information on the cells extracted by said cell extraction means to said mobile communications terminal; wherein said mobile communications terminal includes channel information storage means for receiving and storing the channel information from said base station, said mobile communications terminal establishing connection with either said mobile satellite communications system or said other terrestrial cellular communications system based on the channel information stored in said channel information storage means thereof when needed.

5. The ground cellular communications system according to claim 4, wherein said cell location storage means computes the locations of cells provided by said mobile satellite communications system based on orbit information on one or more Earth-orbiting satellites, and stores the cell locations therein.

6. A mobile satellite communications system, comprising:

mobile communications terminal capable of switching between said mobile satellite communications system and either a terrestrial cellular communications system or another mobile satellite communications system to establish communication with the switched-to system, and a base station independent of a secondary medium and including cell location storage means for storing locations of cells provided by said terrestrial cellular communications system and said other mobile satellite communications system, cell extraction means for extracting a plurality of cells located either within a cell provided by said mobile satellite communications system in which said mobile communications terminal is located, or in the vicinity of said cell, from all the cells provided by said terrestrial cellular communications system or said other mobile satellite communications system based on the cell locations stored in said cell location storage means, channel information storage means for storing channel information for cells having locations stored in said cell location storage means, and channel information transmitting means for transmitting stored channel information on the cells extracted by said cell extraction means to said mobile communications terminal; wherein said mobile communication terminal includes channel information storage means for receiving and storing the channel information from said base station, said mobile communications terminal establishing connection with either said terrestrial cellular communications system or said other mobile satellite communications system based on the channel information stored in said channel information storage means thereof when needed.

* * * * *